US012771060B2

(12) United States Patent
Masuda et al.

(10) Patent No.: US 12,771,060 B2
(45) Date of Patent: Oct. 20, 2026

(54) CONNECTOR INCLUDING PACKING WITH PROTRUDED PIECE AND RAISED PART THAT ARE LOCKED TO HOLDER

(71) Applicant: YAZAKI CORPORATION, Tokyo (JP)

(72) Inventors: Satoki Masuda, Makinohara (JP); Yoshinao Sato, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 352 days.

(21) Appl. No.: 18/522,231

(22) Filed: Nov. 29, 2023

(65) Prior Publication Data

US 2024/0097377 A1 Mar. 21, 2024

Related U.S. Application Data

(63) Continuation of application No. PCT/JP2022/045114, filed on Dec. 7, 2022.

(30) Foreign Application Priority Data

Dec. 14, 2021 (JP) ................................ 2021-202381

(51) Int. Cl.
*H01R 13/52* (2006.01)

(52) U.S. Cl.
CPC ................................ *H01R 13/5202* (2013.01)

(58) Field of Classification Search
CPC .............. H01R 13/5202; H01R 13/506; H01R 13/5205
See application file for complete search history.

(56) References Cited

U.S. PATENT DOCUMENTS

2014/0302711 A1 10/2014 Suzuki et al.
2018/0109028 A1* 4/2018 Rui .................... H01R 13/5202
2020/0288595 A1* 9/2020 Kawai .................... H05K 5/061
2020/0295504 A1 9/2020 Minamino
2021/0066849 A1* 3/2021 Takagi .................. H01R 13/60

FOREIGN PATENT DOCUMENTS

CN 202633595 U 12/2012
CN 107580735 A 1/2018
CN 111133636 A 5/2020
CN 111682350 A 9/2020
(Continued)

OTHER PUBLICATIONS

International Search Report for PCT/JP2022/045114 dated Feb. 28, 2023.

*Primary Examiner* — Abdullah A Riyami
*Assistant Examiner* — Amara Anderson
(74) *Attorney, Agent, or Firm* — KENEALY VAIDYA LLP

(57) ABSTRACT

The present disclosure provides a connector capable of improving the water sealing performance by a packing. A connector of the present disclosure includes: a terminal; a housing that holds the terminal and is fixed to a casing of a device; a cylindrical holder that is engaged with the housing and fitted to an opening part of the casing; and a packing in an annular shape that is mounted to an outer peripheral face of the holder and held by the holder, and seals between the holder and the opening part.

4 Claims, 11 Drawing Sheets

(56) References Cited

FOREIGN PATENT DOCUMENTS

| | | | |
|---|---|---|---|
| DE | 102014103436 | A1 | 9/2015 |
| JP | 2013-131474 | A | 7/2013 |
| JP | 2016-219381 | A | 12/2016 |
| JP | 2018-60730 | A | 4/2018 |
| JP | 2019-91650 | A | 6/2019 |
| JP | 2020-149766 | A | 9/2020 |
| JP | 2021-39889 | A | 3/2021 |

* cited by examiner

CONNECTOR INCLUDING PACKING WITH PROTRUDED PIECE AND RAISED PART THAT ARE LOCKED TO HOLDER

CROSS-REFERENCE TO RELATED APPLICATION(S)

This application is a continuation of International Application No. PCT/JP2022/045114, filed on Dec. 7, 2022 which claims the benefit of priority of the prior Japanese Patent Application No. 2021-202381, filed on Dec. 14, 2021, the entire contents of which are incorporated herein by reference.

BACKGROUND OF THE INVENTION

1. Field of the Invention

The present invention relates to a connector.

2. Description of the Related Art

Conventionally, there are connectors each having a packing. Japanese Patent Application Laid-open No. 2021-39889 discloses a connector that includes a liquid-proof member for sealing a gap between a housing and the peripheral edge of an opening of a casing. The liquid-proof member disclosed in Japanese Patent Application Laid-open No. 2021-39889 is sandwiched between a flange of the housing and a front holder.

When the packing is in contact with two components that are the housing and the front holder, a holding function for holding the packing may become insufficient due to the backlash between the two components. As a result, the packing is rotated, which may cause the water sealing performance to deteriorate.

SUMMARY OF THE INVENTION

The present invention aims at providing a connector that can improve the water sealing performance by the packing.

In order to achieve the above mentioned object, a connector according to one aspect of the present invention includes a terminal; a housing that holds the terminal and is fixed to a casing of a device; a holder in a cylindrical shape that is engaged with the housing and fitted to an opening part of the casing; and a packing in an annular shape that is mounted to an outer peripheral face of the holder and held by the holder, the packing sealing between the holder and the opening part, wherein the holder is engaged with the housing in such a way that there is backlash between the housing and the holder.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a connector according to an embodiment of the present invention will be described in detail with reference to the accompanying drawings. Note, however, that the present invention is not limited by the embodiment. Furthermore, structural components in the following embodiment include those that easily occur to those skilled in the art, or those that are substantially the same.

EMBODIMENT

Figure 1:
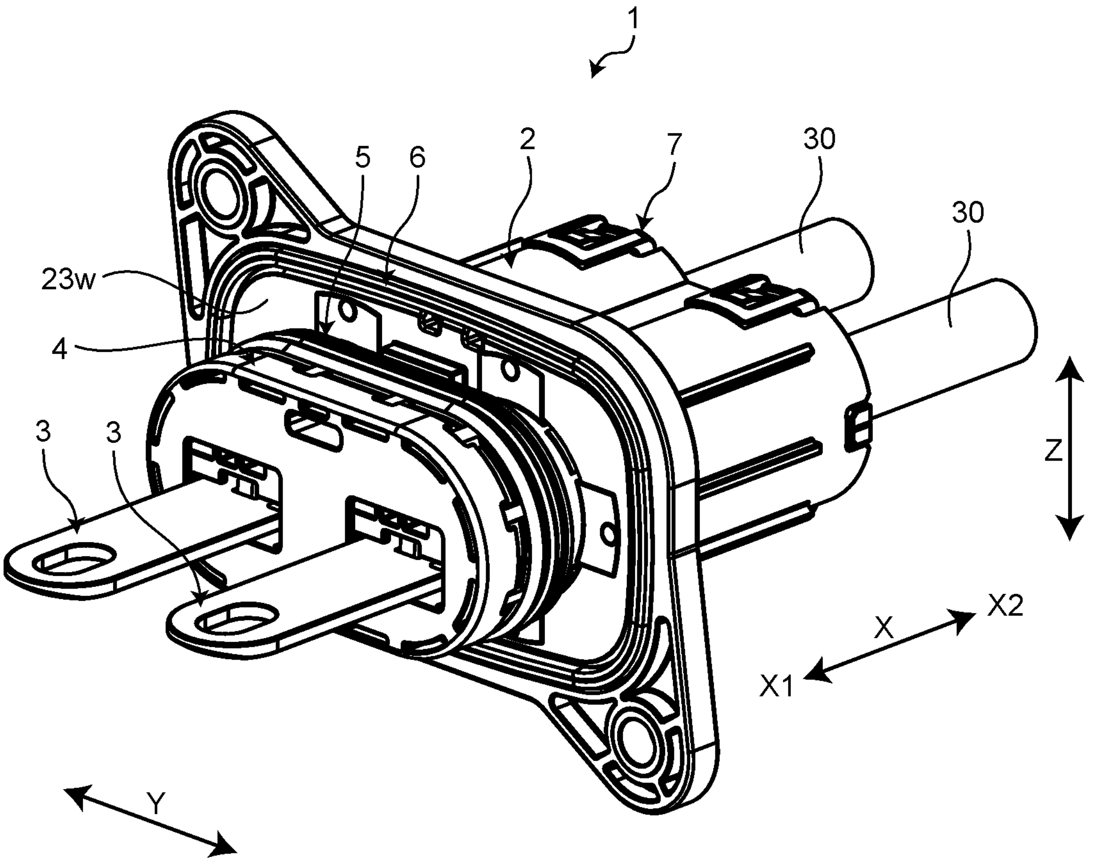
FIG. 1 is a perspective view of a connector according to an embodiment.
Figure 2:
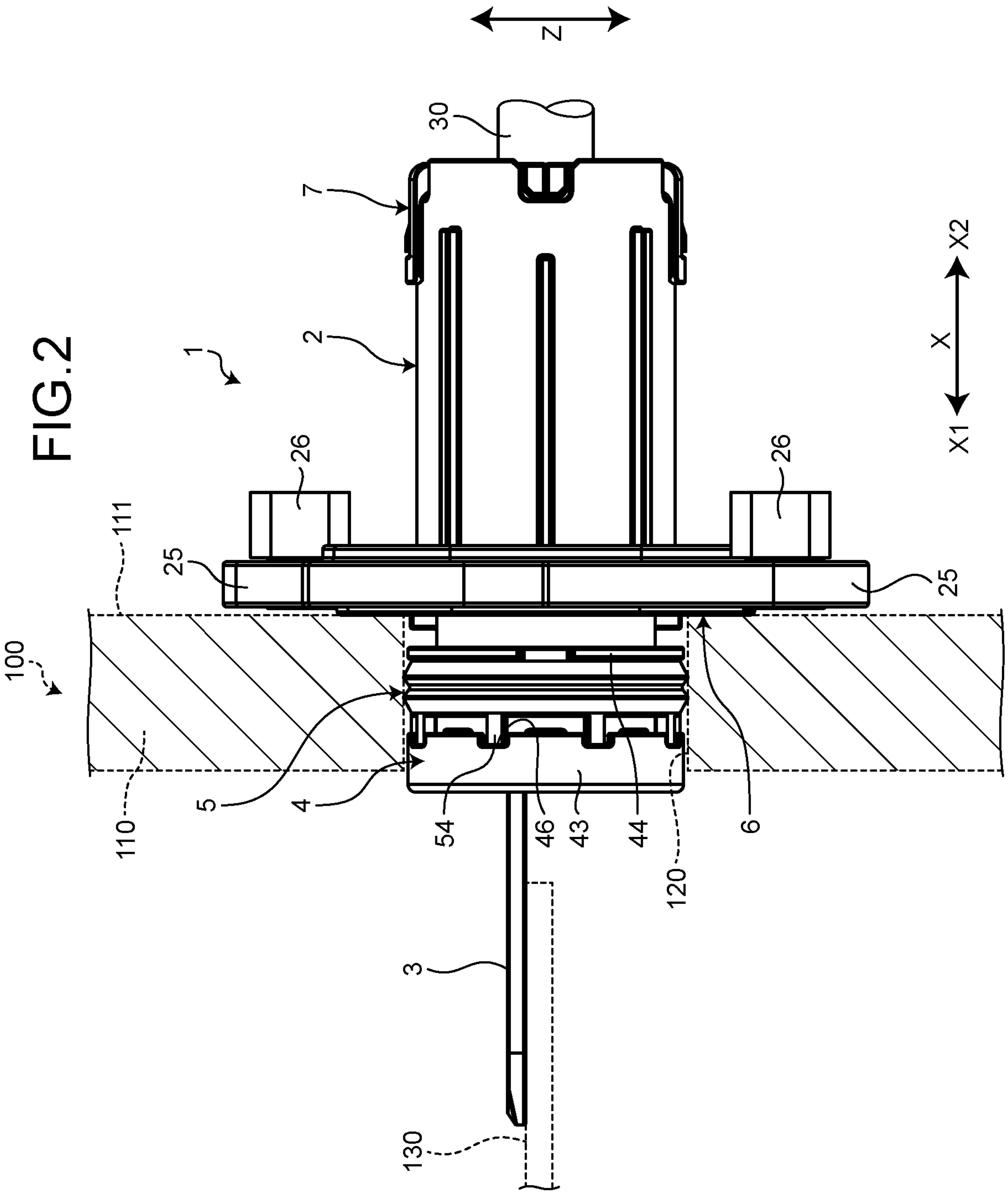
FIG. 2 is a diagram illustrating the connector fixed to a casing of a device.
Figure 3:
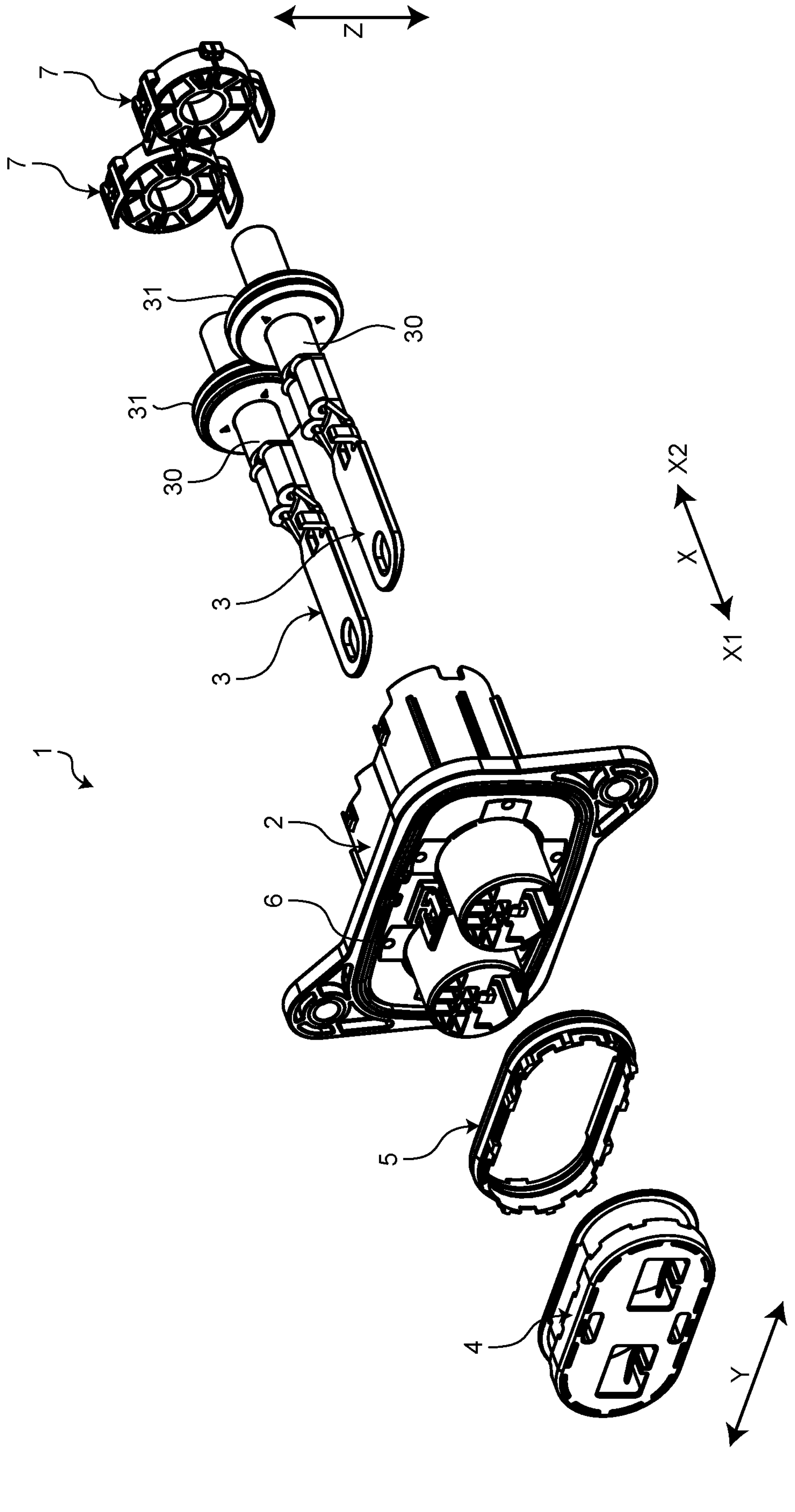
FIG. 3 is an exploded perspective view of the connector according to the embodiment.
Figure 4:
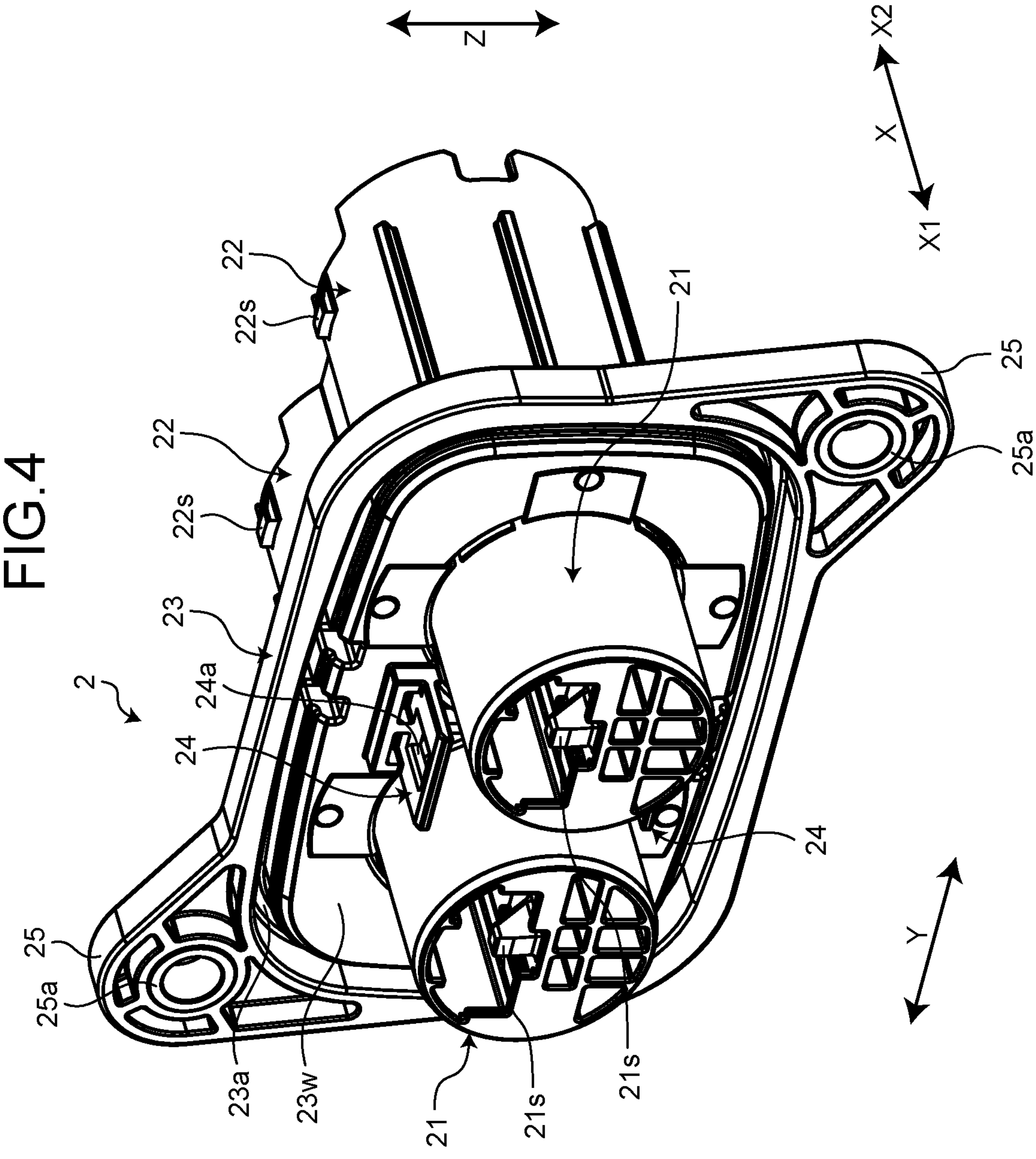
FIG. 4 is a perspective view of a housing according to the embodiment.
Figure 5:
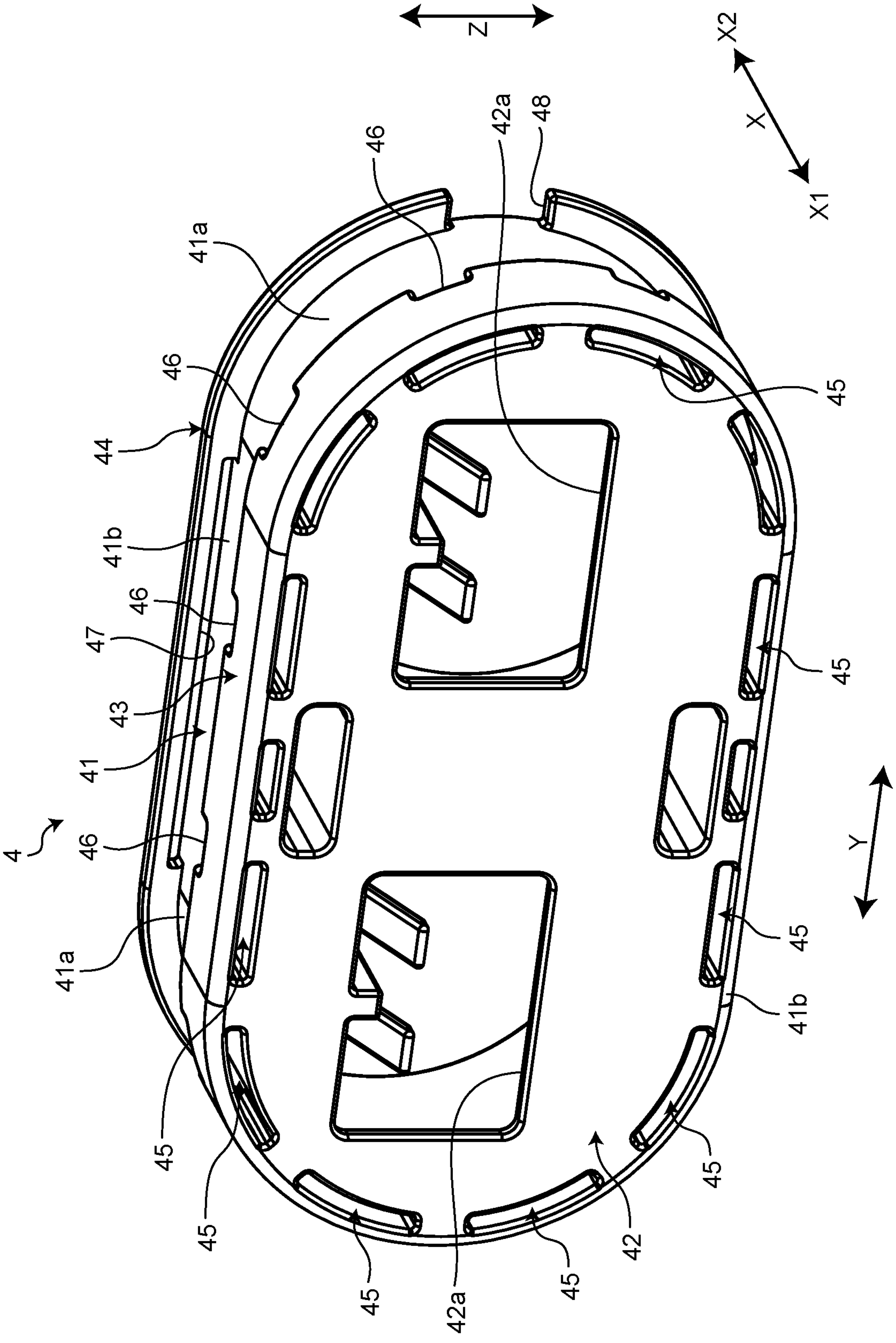
FIG. 5 is a perspective view of a holder according to the embodiment.
Figure 6:
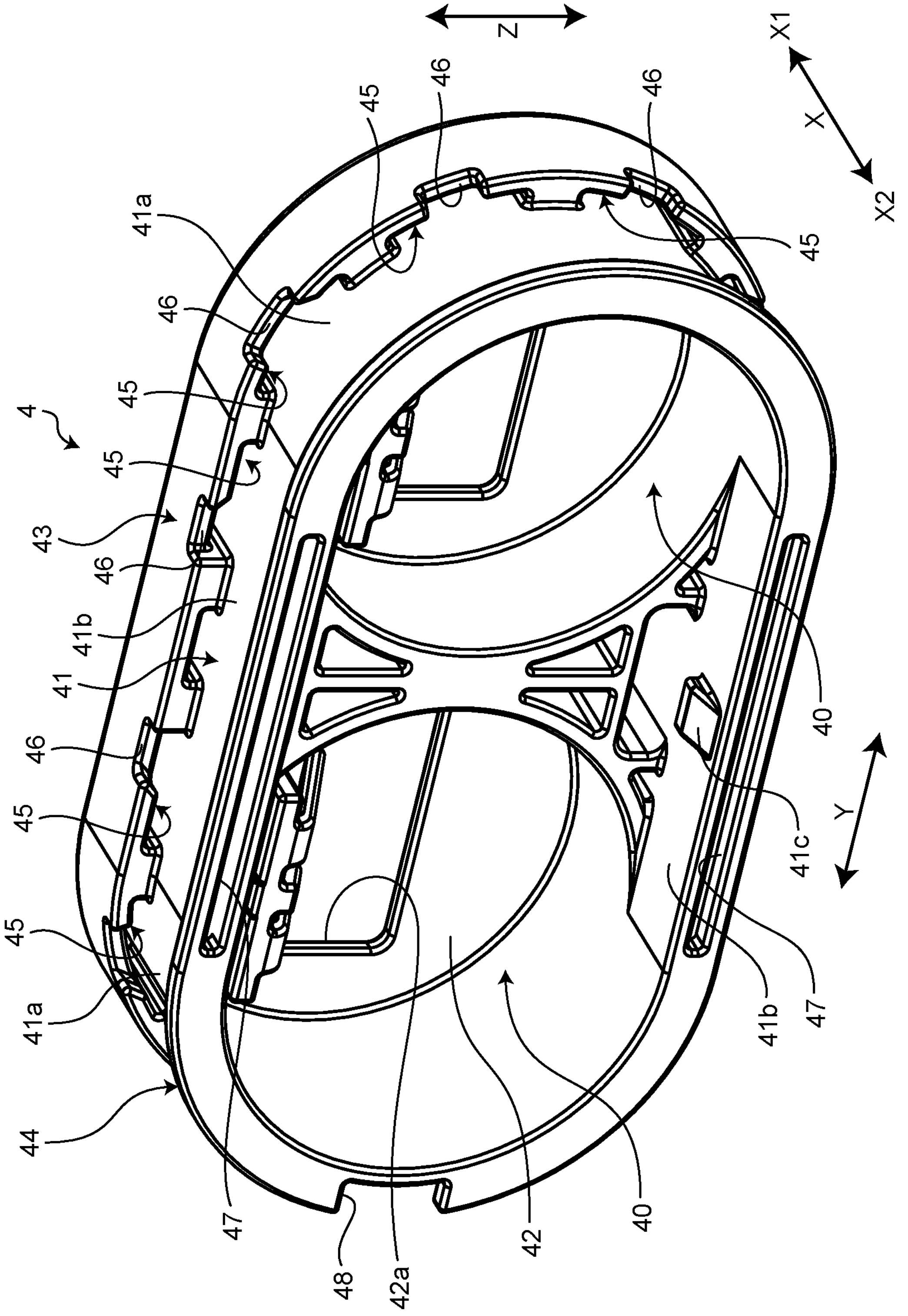
FIG. 6 is a perspective view of the holder according to the embodiment.
Figure 7:
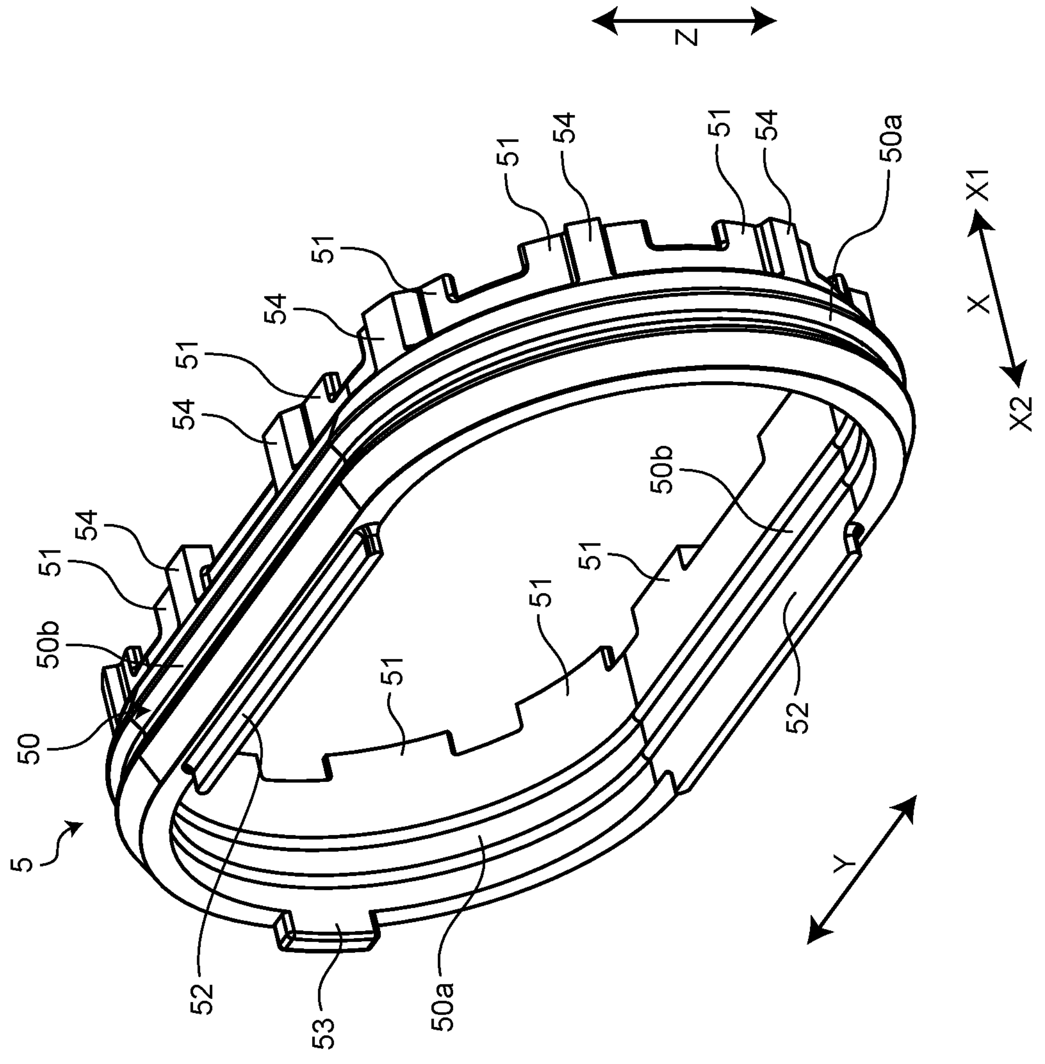
FIG. 7 is a perspective view of a packing according to the embodiment.
Figure 8:
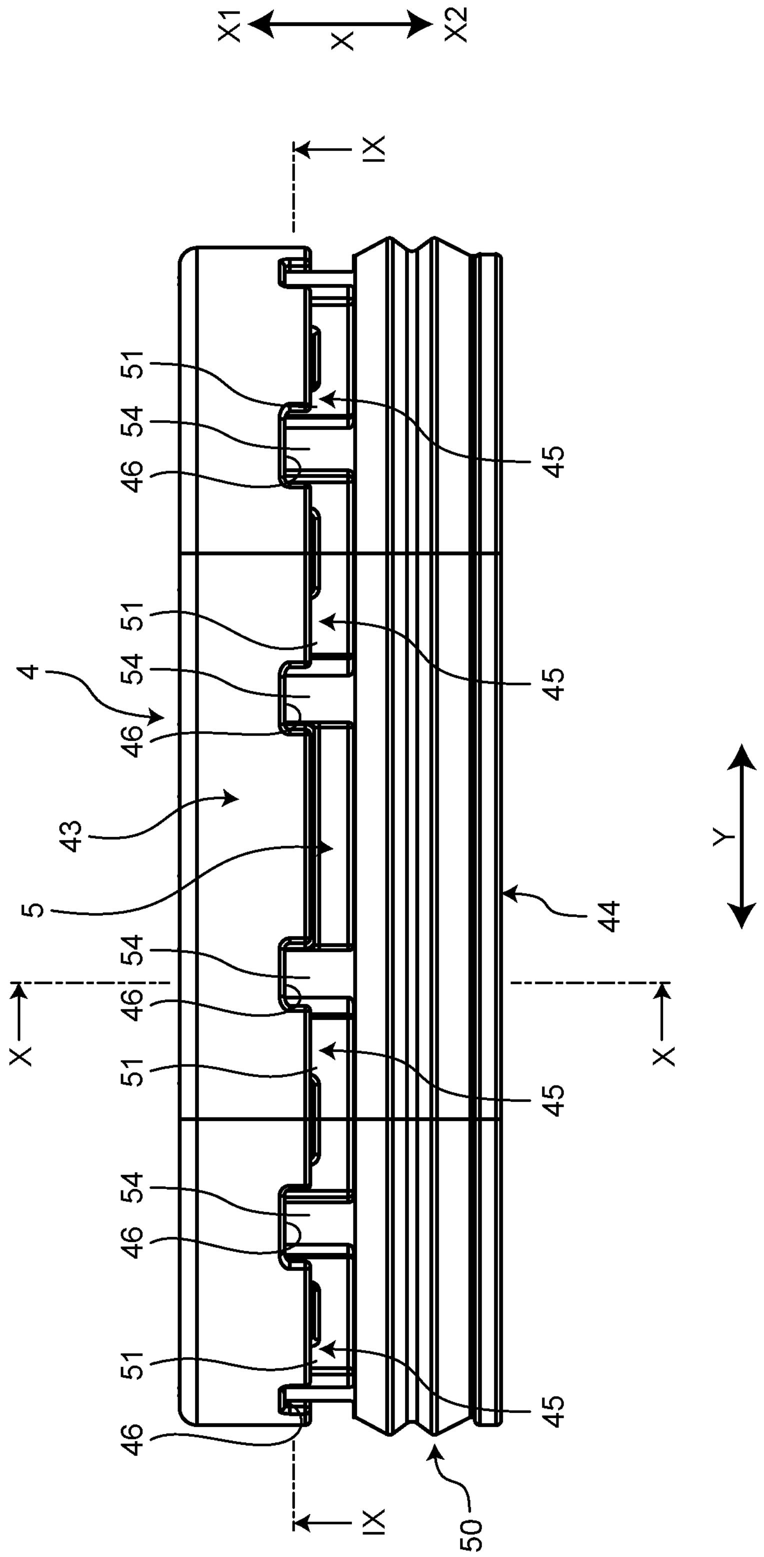
FIG. 8 is a plan view of the packing mounted to the holder.
Figure 9:
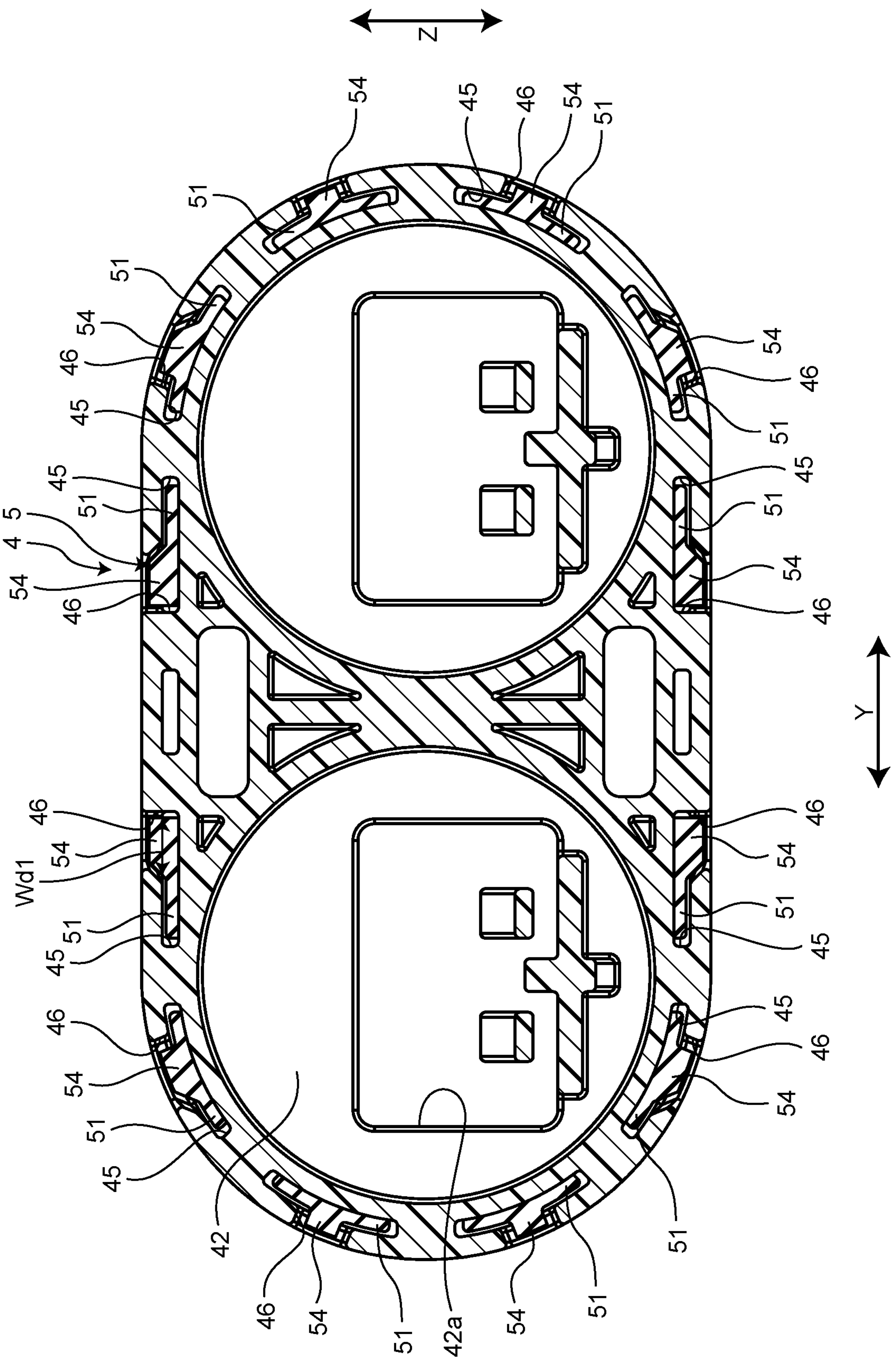
FIG. 9 is a sectional view of the holder and the packing according to the embodiment.
Figure 10:
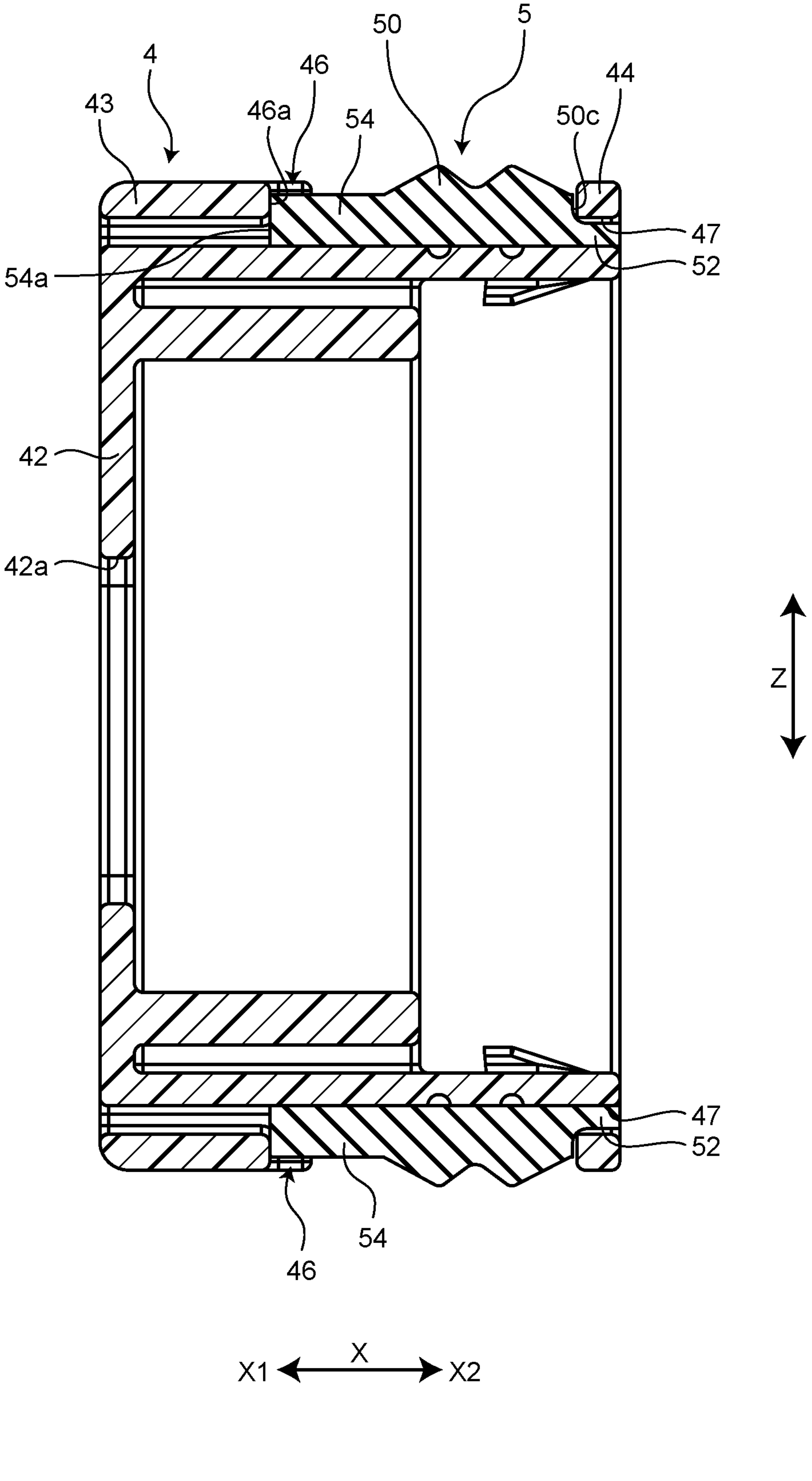
FIG. 10 is a sectional view of the holder and the packing according to the embodiment.
Figure 11:
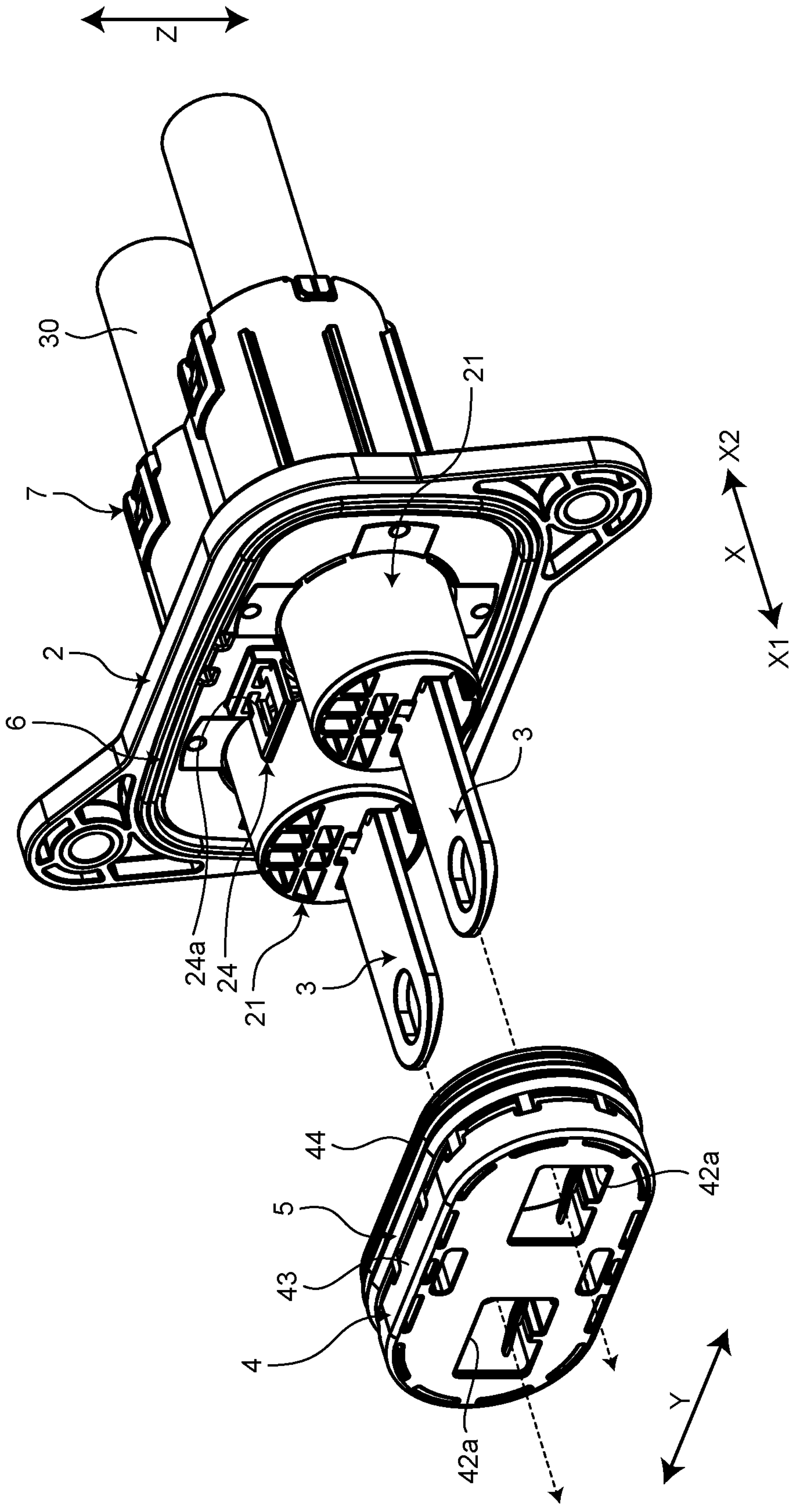
FIG. 11 is a perspective view illustrating a step of attaching the holder to the housing.

The embodiment will be described by referring to FIG. 1 to FIG. 11. The present embodiment relates to a connector. FIG. 1 is a perspective view of the connector according to the embodiment, FIG. 2 is a diagram illustrating the connector fixed to a casing of a device, FIG. 3 is an exploded perspective view of the connector according to the embodiment, FIG. 4 is a perspective view of a housing according to the embodiment, FIG. 5 and FIG. 6 are perspective views of a holder according to the embodiment, FIG. 7 is a perspective view of a packing according to the embodiment, FIG. 8 is a plan view of the packing mounted to the holder, and FIG. 9 and FIG. 10 are sectional views of the holder and the packing according to the embodiment, and FIG. 11 is a perspective view illustrating a step of attaching the holder to the housing. FIG. 9 illustrates a cross section taken along IX-IX line in FIG. 8. FIG. 10 illustrates a cross section taken along X-X line in FIG. 8.

As illustrated in FIG. 1 to FIG. 3, a connector 1 according to the present embodiment includes a housing 2, terminals 3, a holder 4, a packing 5, a face seal 6, and rear holders 7. The holder 4 is engaged with an end part of the housing 2 in an axial direction X. As illustrated in FIG. 2, the connector 1 is fixed to a casing 110 of a device 100 by fastening members 26. The device 100 is loaded on a vehicle such as an automobile, for example. The holder 4 of the connector 1 is inserted into an opening part 120 of the casing 110 along the axial direction X of the connector 1 and fitted to the opening part 120. In the following description, a front side of an insertion direction along which the holder 4 is inserted into the opening part 120 is referred to as "front side X1", and the opposite side of the front side X1 is referred to as "rear side X2". The holder 4 is a front holder positioned on the front side X1 with respect to the housing 2.

The terminals 3 protrude from the holder 4 toward the front side X1. Each of the terminals 3 is connected to a mating terminal 130 inside the casing 110. An electric wire 30 connected to the terminal 3 is drawn outside from an end part of the housing 2 on the rear side X2. The electric wire 30 is covered by a conductive braid, which is not illustrated. The braid is grounded to the casing 110 through a conductive member disposed in the housing 2. In other words, the connector 1 according to the present embodiment is a shield connector having a shielding function. Each of seal members 31 illustrated in FIG. 3 seals between the outer peripheral face of the electric wire 30 and the housing 2. The rear holder 7 engages with the end part of the housing 2 on the rear side X2, and supports the seal member 31.

The packing 5 is an annular member, which is mounted to the outer peripheral face of the holder 4. As illustrated in FIG. 2, the packing 5 seals between the holder 4 and the opening part 120. In the connector 1 according to the present embodiment, the packing 5 is mounted to the holder 4 and held by the holder 4. This improves the water sealing performance of the packing 5, as will be described later.

In the following description, the width direction of the housing 2 is referred to as "width direction Y". The width direction Y is orthogonal to the axial direction X. The direction orthogonal to both axial direction X and width direction Y is referred to as "height direction Z". The housing 2 holds two terminals 3 placed side by side in the width direction Y.

As illustrated in FIG. 4, the housing 2 includes terminal holding parts 21, cylindrical parts 22, and a plate-like part 23. The housing 2 is configured to be fixable to the casing 110 of the device 100. The housing 2 is molded using an insulating synthetic resin, for example. Each of the terminal holding parts 21 is a part that holds the terminal 3, and has a cylindrical shape. The terminal holding part 21 extends in the axial direction X. The housing 2 includes two terminal holding parts 21 placed side by side in the width direction Y. Inside the terminal holding part 21, a locking protrusion 21*s* that locks the terminal 3 is provided.

Each of the cylindrical parts 22 is the part through which the electric wire 30 is inserted, and it has a cylindrical shape. The cylindrical part 22 is connected to an end part of the terminal holding part 21 on the rear side X2, and extends in the axial direction X. The internal space of the terminal holding part 21 and the internal space of the cylindrical part 22 communicate with each other. The housing 2 includes two cylindrical parts 22 placed side by side in the width direction Y. At an rear end of the cylindrical part 22, a locking protrusion 22*s* that houses the rear holder 7 is provided.

The plate-like part 23 is positioned in the connection part between the terminal holding parts 21 and the cylindrical parts 22. The plate-like part 23 is formed in a flat plate-like shape that is orthogonal to the axial direction X. In other words, the terminal holding parts 21 protrude from the plate-like part 23 toward the front side X1, and the cylindrical parts 22 protrude from the plate-like part 23 toward the rear side X2.

The plate-like part 23 includes an opposing wall 23*w* that faces the casing 110. The opposing wall 23*w* surrounds the two terminal holding parts 21. The shape of the opposing wall 23*w* when viewed from the axial direction X is a rectangular shape. As can be seen from FIG. 1, the opposing wall 23*w* is positioned on the outer side of the packing 5 when viewed from the axial direction X. As illustrated in FIG. 4, the opposing wall 23*w* has a groove 23*a* in an annular shape. The groove 23*a* holds the face seal 6 in an annular shape. The face seal 6 seals between the opposing wall 23*w* and a wall face 111 (see FIG. 2) of the casing 110. As illustrated in FIG. 4, the groove 23*a* is formed in a face of the opposing wall 23*w* on the front side X1. The groove 23*a* is positioned in the outer edge part of the opposing wall 23*w*, and surrounds the two terminal holding parts 21.

The housing 2 includes two engagement pieces 24. The engagement pieces 24 protrude from the opposing wall 23*w* toward the front side X1 along the axial direction X. The engagement pieces 24 are positioned in the center in the width direction of the opposing wall 23*w*. The two engagement pieces 24 face each other in the height direction Z with the two terminal holding parts 21 interposed therebetween. Each of the engagement pieces 24 has an engagement hole 24*a*.

The housing 2 includes two fixing parts 25 that are fixed to the casing 110. The fixing parts 25 protrude from the opposing wall 23*w* toward the outer side. The fixing parts 25 protrude from the corners of the opposing wall 23*w*. The two fixing parts 25 are disposed diagonally on the opposing wall 23*w*. Each of the fixing parts 25 has a collar 25*a* in a cylindrical shape. The fastening members 26 illustrated in FIG. 2 are bolts that are inserted into the collars 25*a*. The fastening members 26 fix the housing 2 to the casing 110 by being screwed into mating screw holes.

The holder 4 is molded using an insulating synthetic resin, for example. As illustrated in FIG. 5 and FIG. 6, the holder 4 is formed in a bottomed cylindrical shape. The shape of the holder 4 is a shape that can be fitted into the opening part 120 of the casing 110. The holder 4 includes a cylindrical part 41 and a front wall 42. The cylindrical part 41 has a cylindrical shape extending along the axial direction X. The shape of the cylindrical part 41 when viewed from the axial direction X is a substantially elliptical shape.

As illustrated in FIG. 6, the holder 4 includes two recessed parts 40 placed side by side in the width direction Y. The shape of the recessed part 40 is a columnar shape that corresponds to the shape of the terminal holding part 21 of the housing 2. The cylindrical part 41 is formed to encompass the two recessed parts 40. More specifically, the cylindrical part 41 includes two arc parts 41*a* and two sidewall parts 41*b*. A cross-sectional shape of the arc part 41*a* is a semicircular shape. The two arc parts 41*a* face each other in the width direction Y. The sidewall part 41*b* is formed in a flat plate-like shape, and connects the two arc parts 41*a* along the width direction Y. The two sidewall parts 41*b* face each other in the height direction Z.

The front wall 42 closes an end part of the cylindrical part 41 on the front side X1. The front wall 42 has two through-holes 42*a* into which the terminals 3 are inserted. As illustrated in FIG. 6, the sidewall part 41*b* includes a locking protrusion 41*c*. The locking protrusion 41*c* protrudes from the inner face of the sidewall part 41*b* toward the height direction Z. Each of the two sidewall parts 41*b* includes one locking protrusion 41*c*. The locking protrusion 41*c* engages with the engagement piece 24 of the housing 2.

The holder 4 further includes a first holding wall 43 and a second holding wall 44 for holding the packing 5. The first holding wall 43 is positioned at the end part of the cylindrical part 41 on the front side X1. The first holding wall 43 is positioned on the outer side of the radial direction with respect to the cylindrical part 41, and is formed in an annular shape. In other words, the first holding wall 43 rises from the cylindrical part 41 toward the outer side of the radial direction. Note that, with the central axis line of the holder 4 as the center, the radial direction is defined as a radial direction that is orthogonal to the central axis line. The first holding wall 43 holds the packing 5 from the front side X1 of the axial direction X.

The second holding wall 44 is positioned at the end part of the cylindrical part 41 on the rear side X2. The second holding wall 44 is formed in a flange shape, and protrudes from the cylindrical part 41 toward the outer side of the radial direction. The second holding wall 44 faces the first holding wall 43 in the axial direction X. The second holding wall 44 holds the packing 5 from the rear side X2 of the axial direction X. The cylindrical part 41, the first holding wall 43, and the second holding wall 44 form a groove for housing the packing 5.

As illustrated in FIG. 6, the first holding wall 43 includes a plurality of first locking parts 45 and a plurality of second locking parts 46. Each of the first locking parts 45 is a recessed part that is recessed toward the front side X1 along the axial direction X. The first locking part 45 discussed herein passes through the first holding wall 43 along the axial direction X. The first locking part 45 has an opening part that opens toward the second holding wall 44. The shape of the first locking part 45 when viewed from the axial direction X is a flat rectangular shape. More specifically, the first locking part 45 has a long and narrow shape along the circumferential direction of the cylindrical part 41. The first locking parts 45 are disposed along the circumferential direction. The first locking parts 45 are disposed in each of the arc parts 41*a* and the sidewall parts 41*b*.

The second locking part 46 is a notch formed in the first holding wall 43. The second locking part 46 is positioned in an edge part of the first holding wall 43 on the rear side X2. The second locking part 46 is disposed on the wall part that configures the first locking part 45. A single second locking part 46 is provided for a single first locking part 45. The shape of the second locking part 46 in a plan view is a rectangular shape.

The second holding wall 44 has through-holes 47 and a notch 48. The through-hole 47 passes through the second holding wall 44 along the axial direction X. The shape of the through-holes 47 is a long and narrow rectangular shape along the width direction Y. The second holding wall 44 according to the present embodiment includes two through-holes 47. One through-hole 47 is disposed corresponding to one sidewall part 41*b*, and the other through-hole 47 is disposed corresponding to the other sidewall part 41*b*. The notch 48 is disposed at the end part of the second holding wall 44 in the width direction Y. The shape of the notch 48 in a plan view is a rectangular shape.

As illustrated in FIG. 7, the packing 5 has an annular shape. The shape of the packing 5 is a shape that can seal between the holder 4 and the opening part 120 of the casing 110. The packing 5 is molded using a synthetic resin such as rubber. The packing 5 discussed herein includes a main body 50 in an annular shape, first protruded pieces 51, second protruded pieces 52, a third protruded piece 53, and raised parts 54. The main body 50 is the part that seals between the holder 4 and the opening part 120, and it is mounted to the cylindrical part 41.

The shape of the main body 50 is an elliptical shape that corresponds to the shape of the cylindrical part 41. More specifically, the main body 50 includes two arc parts 50*a* and two straight parts 50*b*. The shape of the arc part 50*a* when viewed from the axial direction X is a semicircular shape. The two arc parts 50*a* face each other in the width direction Y. The straight part 50*b* connects the two arc parts 50*a* along the width direction Y. The two straight parts 50*b* face each other in the height direction Z. A lip in an annular shape is formed in each of the inner peripheral face and the outer peripheral face of the main body 50.

The first protruded piece 51 protrudes from the main body 50 toward the front side X1 of the axial direction X. The shape of the first protruded piece 51 is a long and narrow flat plate-like shape formed along the circumferential direction. The shape of the first protruded piece 51 in a plan view is a rectangular shape. The packing 5 according to the present embodiment includes a plurality of first protruded pieces 51 disposed along the circumferential direction. The first protruded pieces 51 protrude from each of the arc parts 50*a* and the straight parts 50*b*.

The raised part 54 rises from the first protruded piece 51 toward the outer side of the radial direction. The packing 5 discussed herein has a single raised part 54 for a single first protruded piece 51. The raised part 54 extends along the axial direction X, and one end thereof is connected to the main body 50. In other words, the raised part 54 extends from the main body 50 toward the front side X1. The raised part 54 is formed to the front end of the first protruded piece 51. The shape of the raised part 54 when viewed from the axial direction X is a trapezoid shape.

The second protruded piece 52 protrudes from the main body 50 toward the rear side X2 of the axial direction X. The shape of the second protruded piece 52 is a long and narrow flat plate-like shape formed along the circumferential direction. The second protruded piece 52 discussed herein extends in the width direction Y. The shape of the second protruded piece 52 in a plan view is a rectangular shape. The packing 5 according to the present embodiment includes two second protruded pieces 52. One of the second protruded pieces 52 protrudes from one of the straight parts 50*b*. The other one of the second protruded pieces 52 protrudes from the other one of the straight parts 50*b*.

The third protruded piece 53 protrudes from the main body 50 toward the rear side X2 of the axial direction X. The shape of the third protruded piece 53 is a long and narrow flat plate-like shape formed along the height direction Z. The shape of the third protruded piece 53 in a plan view is a rectangular shape. The third protruded piece 53 protrudes from the arc part 50*a*.

As illustrated in FIG. 8, the packing 5 is mounted to the outer peripheral face of the holder 4. The packing 5 is attached to the holder 4 such that the main body 50 covers the cylindrical part 41 of the holder 4. The first protruded pieces 51 of the packing 5 are inserted into the first locking parts 45 of the holder 4. More specifically, the first protruded pieces 51 are inserted into the first locking parts 45 along the axial direction X. At this time, the raised parts 54 are inserted into the second locking parts 46 along the axial direction X. The second protruded pieces 52 of the packing 5 (see FIG. 7) are inserted into the through-holes 47 of the holder 4 (see FIG. 6). Furthermore, the third protruded piece 53 (see FIG. 7) is inserted into the notch 48 (see FIG. 6).

As illustrated in FIG. 9, the first protruded pieces 51 of the packing 5 are locked by the first locking parts 45 of the holder 4. Each of the first locking parts 45 houses the corresponding first protruded piece 51, and locks the first protruded piece 51 in the circumferential direction. The first locking part 45 is configured to lock the first protruded piece 51 from both sides in the circumferential direction. The holder 4 according to the present embodiment can effectively prevent the packing 5 from rotating by locking the first protruded pieces 51 from both sides in the circumferential direction.

Furthermore, the first locking part 45 faces the first protruded piece 51 in the thickness direction of the first protruded piece 51. Thus, the first locking part 45 can lock the first protruded piece 51 from the outer side of the radial direction. The holder 4 according to the present embodiment can effectively suppress the packing 5 from floating by locking the first protruded pieces 51 from the outer side of the radial direction.

The raised part 54 of the packing 5 is locked by the second locking part 46 from both sides in the circumferential direction. The holder 4 according to the present embodiment can effectively prevent the packing 5 from rotating by locking the raised parts 54 from both sides in the circumferential direction. The raised parts 54 are connected to the main body 50. Therefore, it is possible to effectively prevent the main body 50 from rotating by locking the raised parts 54.

Furthermore, part of the second locking parts 46 has a tapered shape. In the holder 4 discussed herein, the second locking parts 46 positioned on the side along the width direction Y have a tapered shape. Width Wd1 of the second locking part 46 in a tapered shape becomes narrower toward the outer side of the radial direction. The second locking part 46 in a tapered shape can regulate the movement of the raised part 54 toward the outer side of the radial direction. Therefore, the holder 4 according to the present embodiment can effectively suppress the packing 5 from floating in the long side.

As illustrated in FIG. 10, the raised part 54 is supported by the second locking part 46 from the front side X1 of the axial direction X. The second locking part 46 includes a locking face 46*a* facing toward the rear side X2. A tip end face 54*a* of the raised part 54 abuts against the locking face 46*a* and is locked by the locking face 46*a*. The second protruded piece 52 of the packing 5 is inserted into the through-hole 47 of the holder 4, and locked by the through-hole 47. As illustrated in FIG. 10, the through-hole 47 locks the second protruded piece 52 from the outer side of the radial direction. The through-hole 47 also locks the second protruded piece 52 from both sides in the circumferential direction.

As illustrated in FIG. 10, the second holding wall 44 supports a side face 50*c* of the main body 50. In other words, the holder 4 sandwiches the packing 5 with the locking face 46*a* and the second holding wall 44 from both sides of the axial direction X. Therefore, the holder 4 according to the present embodiment can effectively suppress the packing 5 from rotating.

As illustrated in FIG. 11, the holder 4 with the packing 5 mounted thereto is engaged with the housing 2. The terminals 3 protrude from the terminal holding parts 21 toward the front side X1. The terminals 3 are inserted into the through-holes 42*a* of the holder 4, and protrudes from the through-holes 42*a* toward the front side X1. The holder 4 is engaged with the engagement pieces 24 of the housing 2, and held by the housing 2.

The connector 1 according to the present embodiment can suppress contact between the packing 5 and the terminals 3 at the time of assembly. As a comparative example, a connector in which a packing in an annular shape is mounted to a housing will be discussed. With the connector of the comparative example, there is a possibility that the packing comes into contact with the terminals when the packing is attached to the housing from the front side X1. As a result, the edges of the terminals may damage the packing, or oil from the packing may adhere to the terminals. On the contrary, with the connector 1 according to the present embodiment, the holder 4 can protect the packing 5 and regulate the contact between the packing 5 and the terminals 3.

The connector 1 according to the present embodiment can suppress the packing 5 from rotating. As illustrated in FIG. 2, the holder 4 and the packing 5 are inserted into the opening part 120 when the connector 1 is attached to the casing 110. When the packing 5 slides against the opening part 120, a force in the circumferential direction acts against the packing 5 in some cases. The connector 1 according to the present embodiment can suppress the packing 5 from rotating, as will be described below.

First, as a comparative example, a connector in which a packing is attached to a hood part of a housing and the packing is held by a front holder will be discussed. In such a connector, for example, the front holder is provided with an antirotation structure for the packing. Note here that there is backlash between the housing and the holder. This backlash makes the antirotation function of the front holder insufficient, so that the packing rotates in some cases.

On the contrary, in the connector 1 according to the present embodiment, the packing 5 is mounted to the holder 4 and held by the holder 4. This allows the holder 4 to stably prevent the packing 5 from rotating. Therefore, the connector 1 according to the present embodiment can improve the water sealing performance by the packing 5.

Furthermore, in the connector 1 according to the present embodiment, the packing 5 is aligned by the backlash between the holder 4 and the housing 2. For example, even when the mount position of the housing 2 with respect to the casing 110 is misaligned, the misalignment can be absorbed by the backlash between the holder 4 and the housing 2. Thus, when the packing 5 is inserted into the opening part 120, the force is less likely to be concentrated on one part of the packing 5. Therefore, the packing 5 is less likely to rotate. Furthermore, after the holder 4 is fitted to the opening part 120, the degree of adhesion of the packing 5 to the opening part 120 is likely to become uniform. Therefore, the connector 1 according to the present embodiment can improve the water sealing performance by the packing 5.

As described above, the connector 1 according to the present embodiment includes the terminals 3, the housing 2, a holder 4 in a cylindrical shape, and the packing 5. The housing 2 holds the terminals 3 and is fixed to the casing 110 of the device 100. The holder 4 is engaged with the housing 2, and fitted into the opening part 120 of the casing 110. The packing 5 is mounted to the outer peripheral face of the holder 4, and held by the holder 4. The packing 5 seals between the holder 4 and the opening part 120. In the connector 1 according to the present embodiment, the packing 5 is mounted to the holder 4 and held by the holder 4. Therefore, the connector 1 according to the present embodiment can suppress the packing 5 from rotating and improve the water sealing performance of the packing 5.

The connector 1 according to the present embodiment further includes the face seal 6 in an annular shape. The housing 2 includes the opposing wall 23*w* that faces the wall face 111 of the casing 110. The opposing wall 23*w* is positioned on the outer side than the packing 5 is. The face seal 6 is held by the opposing wall 23*w*, and seals between the opposing wall 23*w* and the wall face 111 of the casing 110. The face seal 6 is capable of restricting intrusion of foreign matters such as water.

The packing 5 according to the present embodiment includes the main body 50 in an annular shape that seals between the holder 4 and the opening part 120, and the first protruded pieces 51 protruding from the main body 50. The first protruded piece 51 protrudes toward the front side X1 of the insertion direction along which the holder 4 is inserted into the opening part 120. The holder 4 includes the first locking parts 45. The first locking part 45 houses the corresponding first protruded piece 51, and locks the first protruded piece 51 in the circumferential direction. A plurality of the first protruded pieces 51 and a plurality of the first locking parts 45 are disposed along the circumferential direction. With such a configuration, the connector 1 according to the present embodiment can regulate the rotation of the packing 5 and improve the water sealing performance.

The packing 5 according to the present embodiment includes the raised part 54 that rises from the first protruded piece 51 toward the outer side of the radial direction. The raised part 54 extends from the main body 50 toward the front side X1 of the insertion direction. The holder 4 includes the second locking part 46 that locks the raised part 54 from both sides in the circumferential direction. With such a configuration, the connector 1 according to the present embodiment can regulate the rotation of the packing 5 and improve the water sealing performance.

The packing 5 according to the present embodiment includes the second protruded pieces 52. The second protruded pieces 52 protrude toward the rear side X2 of the insertion direction and extend in the circumferential direction. The holder 4 has the through-holes 47 into which the second protruded pieces 52 are inserted. The through-hole 47 locks the second protruded piece 52 from the outer side of the radial direction. With such a configuration, the connector 1 according to the present embodiment can regulate the rotation of the packing 5 and improve the water sealing performance. The through-hole 47 can regulate floating of the packing 5 when the packing 5 is inserted into the opening part 120, for example.

Note that the shape of the housing 2 and the shape of the packing 5 are not limited to the shapes illustrated as the examples. The terminals 3 need not protrude from the housing 2. For example, the entire terminals 3 may be housed in the housing 2. The number of terminals 3 held by the housing 2 is not limited to two. The connector 1 need not be a shield connector.

The contents disclosed in the above embodiment may be combined and implemented as appropriate.

In the connector according to the present embodiment, the packing is mounted to the outer peripheral face of the holder and held by the holder. Therefore, the water sealing performance by the packing is less likely to deteriorate compared to the configuration in which the packing is held by two components. According to the connector of the present embodiment, it is possible to achieve an effect of improving the water sealing performance by the packing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal;

a housing that holds the terminal and is configured to be fixed to a casing of a device;

a holder in a cylindrical shape that is engaged with the housing and configured to be fitted to an opening part of the casing; and a packing in an annular shape that is mounted to an outer peripheral face of the holder and held by the holder, the packing configured to seal between the holder and the opening part, wherein the holder is engaged with the housing in such a way that there is backlash between the housing and the holder, the packing includes: a main body in an annular shape that seals between the holder and the opening part, and a first protruded piece protruding from the main body, the first protruded piece protrudes toward a front side of an insertion direction along which the holder is inserted into the opening part, the holder includes a first locking part that houses the first protruded piece and locks the first protruded piece in a circumferential direction, a plurality of the first protruded pieces and a plurality of the first locking parts are disposed along the circumferential direction, the packing includes a raised part that rises from the first protruded piece toward an outer side of a radial direction, the raised part extends from the main body toward the front side of the insertion direction, and the holder includes a second locking part that locks the raised part from both sides in the circumferential direction.

2. The connector according to claim 1, further comprising:

a face seal in an annular shape, wherein the housing includes an opposing wall that faces a wall face of the casing, and the opposing wall is positioned on an outer side of the packing, and the face seal is held by the opposing wall, and the face seal is configured to seal between the opposing wall and the wall face of the casing.

3. The connector according to claim 2, wherein the packing includes a second protruded piece that protrudes toward a rear side of the insertion direction, and extends in the circumferential direction, and the holder includes a through-hole where the second protruded piece is inserted, and the through-hole locks the second protruded piece from the outer side of the radial direction.

4. The connector according to claim 1, wherein the packing includes a second protruded piece that protrudes toward a rear side of the insertion direction, and extends in the circumferential direction, and the holder includes a through-hole where the second protruded piece is inserted, and the through-hole locks the second protruded piece from the outer side of the radial direction.

* * * * *